United States Patent
Shi et al.

(10) Patent No.: US 11,985,673 B2
(45) Date of Patent: May 14, 2024

(54) METHOD AND TERMINAL FOR TRANSMITTING MULTIPLE PHYSICAL DOWNLINK CONTROL CHANNELS (PDCCHS) THROUGH MULTIPLE GROUPS OF CONTROL RESOURCE SETS (CORESETS)

(71) Applicant: GUANGDONG OPPO MOBILE TELECOMMUNICATIONS CORP., LTD., Guangdong (CN)

(72) Inventors: Zhihua Shi, Guangdong (CN); Wenhong Chen, Guangdong (CN); Yun Fang, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 338 days.

(21) Appl. No.: 17/244,751

(22) Filed: Apr. 29, 2021

(65) Prior Publication Data
US 2021/0250926 A1    Aug. 12, 2021

Related U.S. Application Data

(63) Continuation of application No. PCT/CN2018/113814, filed on Nov. 2, 2018.

(51) Int. Cl.
*H04W 72/04* (2023.01)
*H04W 72/23* (2023.01)

(52) U.S. Cl.
CPC .................................. *H04W 72/23* (2023.01)

(58) Field of Classification Search
CPC ..... H04W 72/23; H04W 72/00; H04W 24/02; H04W 72/51; H04B 7/00; H04L 5/0023; H04L 5/0032; H04L 5/00; H04L 5/0053
See application file for complete search history.

(56) References Cited

U.S. PATENT DOCUMENTS

| 2002/0091844 A1* | 7/2002 | Craft .................... H04L 69/163 |
| | | 719/321 |
| 2018/0227777 A1 | 8/2018 | Sun et al. |

(Continued)

FOREIGN PATENT DOCUMENTS

| CN | 108111267 A | 6/2018 |
| CN | 108631934 A | 10/2018 |

(Continued)

OTHER PUBLICATIONS

Summary of views on multi-TRP & multi-panel transmission France, Jun. 29, 2017 (Year: 2017).*

(Continued)

*Primary Examiner* — Mewale A Ambaye
(74) *Attorney, Agent, or Firm* — Perkins Coie LLP

(57) ABSTRACT

A method for wireless communication includes that: a terminal device detects M downlink control channels using N groups of search spaces or N groups of control resource sets (CORESETs), N being an integer greater than or equal to 2, and M being an integer greater than or equal to 2, and different groups of search spaces or different groups of CORESETs are used for detecting different downlink control channels. Further, a terminal device is also provided.

20 Claims, 12 Drawing Sheets

500

A network device transmits second information to a terminal device, the second information indicates a respective search space/control resource set (CORESET) group to which each search space/CORESET included in N search space/CORESET groups belongs, where the N search space/CORESET groups are used by the terminal device for detecting M downlink control channels, N is an integer greater than or equal to 2, M is an integer greater than or equal to 2, and different search space/CORESET groups are used for detecting different downlink control channels — 510

(56) References Cited

U.S. PATENT DOCUMENTS

| | | | |
|---|---|---|---|
| 2022/0368498 A1* | 11/2022 | Sun | H04L 5/0094 |
| 2023/0106730 A1* | 4/2023 | Chen | H04L 5/0064 |
| | | | 370/329 |
| 2023/0156740 A1* | 5/2023 | Kim | H04L 5/0048 |
| | | | 370/329 |

FOREIGN PATENT DOCUMENTS

| | | |
|---|---|---|
| CN | 108632840 A | 10/2018 |
| CN | 108632960 A | 10/2018 |
| KR | 20180089870 A | 8/2018 |

OTHER PUBLICATIONS

"Multiple NR-PDCCH for multiple TRP transmission" China, Jun. 29, 2017 (Year: 2017).*

3GPP TSG RAN WG1 NR Ad Hoc Meeting R1-1709924, Qingdao, China, Jun. 27-30, 2017, Agenda Item: 5.1.2.1.6, Source: Huawei, HiSilicon, Title: Multiple NR-PDCCH for Multiple TRP transmission, Document for: Discussion and decision. 5 pages.

3GPP TSG RAN WG1 NR Ad-Hoc#2 R1-1711857, Qingdao, P.R. China, Jun. 27-30, 2017, Source: CATT, Title: Summary of views on multi-TRP & multi-panel transmission, Agenda Item: 5.1.2.1.6, Document for: Discussion and decision. 3 pages.

Supplementary European Search Report in the European application No. 18938329.2, dated Oct. 22, 2021. 10 bages.

Written Opinion of the International Search Authority in the international application No. PCT/CN2018/113814, dated Aug. 8, 2019. 6 pages with English translation.

International Search Report in the international application No. PCT/CN2018/113814, dated Aug. 8, 2019.

First Office Action of the Korean application No. 10-2021-7016540, issued on Mar. 18, 2024, 11 pages with English translation.

* cited by examiner

200

A terminal device detects M downlink control channels using N search space/control resource set (CORESET) groups, where N is an integer greater than or equal to 2, M is an integer greater than or equal to 2, and different search space/CORESET groups are used for detecting different downlink control channels ⸺ 210

A network device detects M downlink control channels using N search space/control resource set (CORESET) groups, and the network device transmits the downlink control channels through beams or multiple antenna panels, where N is an integer greater than or equal to 2, M is an integer greater than or equal to 2, and different search space/CORESET groups are used for detecting different downlink control channels — 310

A network device transmits first information to a terminal device, the first information indicates a search space/control resource set (CORESET) group, among N search space/CORESET groups, to which a first search space/CORESET belongs, where the N search space/CORESET groups are used by the terminal device for detecting M downlink control channels, N is an integer greater than or equal to 2, M is an integer greater than or equal to 2, and different search space/CORESET groups are used for detecting different downlink control channels ⟵ 410

A network device transmits second information to a terminal device, the second information indicates a respective search space/control resource set (CORESET) group to which each search space/CORESET included in N search space/ CORESET groups belongs, where the N search space/ CORESET groups are used by the terminal device for detecting M downlink control channels, N is an integer greater than or equal to 2, M is an integer greater than or equal to 2, and different search space/CORESET groups are used for detecting different downlink control channels ⸺ 510

FIG. 7

METHOD AND TERMINAL FOR TRANSMITTING MULTIPLE PHYSICAL DOWNLINK CONTROL CHANNELS (PDCCHS) THROUGH MULTIPLE GROUPS OF CONTROL RESOURCE SETS (CORESETS)

CROSS-REFERENCE TO RELATED APPLICATION

This application is a U.S. continuation application of International Application No. PCT/CN2018/113814, entitled "WIRELESS COMMUNICATION METHOD, NETWORK DEVICE, AND TERMINAL DEVICE", filed on Nov. 2, 2018, the disclosure of which is hereby incorporated by reference in its entirety.

TECHNICAL FIELD

The present disclosure relates to the technical field of communications, and particularly to a method for wireless communication, and a terminal device.

BACKGROUND

In the current discussions on new radio (NR), a terminal device may communicate with multiple transmission-reception points (TRPs) or multiple beams simultaneously.

Multiple physical downlink control channels (PDCCHs) may be transmitted through the multiple TRPs or multiple beams, respectively.

SUMMARY

The aspects of the present disclosure provide a method for wireless communication, and a terminal device.

In a first aspect, a method for wireless communication is provided, which includes that a terminal device detects M downlink control channels using N groups of search spaces or N groups of control resource sets (CORESETs), where N is an integer greater than or equal to 2, M is an integer greater than or equal to 2, and different groups of search spaces or different groups of CORESETs are used for detecting different downlink control channels.

In a second aspect, a terminal device is provided, which includes a transceiver, configured to detect M downlink control channels using N groups of search spaces or N groups of control resource sets (CORESETs), where N is an integer greater than or equal to 2, M is an integer greater than or equal to 2, and different groups of search spaces or different groups of CORESETs are used for detecting different downlink control channels.

BRIEF DESCRIPTION OF THE DRAWINGS

FIG. 4 is a schematic diagram of a method for wireless communication according to an embodiment of the present disclosure.

FIG. 5 is another schematic diagram of a method for wireless communication according to an embodiment of the present disclosure.

FIG. 6 is still another schematic diagram of a method for wireless communication according to an embodiment of the present disclosure.

FIG. 7 is yet still another schematic diagram of a method for wireless communication according to an embodiment of the present disclosure.

DETAILED DESCRIPTION

In the related art, how to implement simultaneous transmission of multiple downlink control channels is a problem urgent to be solved.

The following describes the technical solutions in the embodiments of the present disclosure with reference to the accompanying drawings in the embodiments of the present disclosure. Apparently, the described embodiments are some embodiments of the present disclosure rather than all of the embodiments. All other embodiments obtained by a person of ordinary skill in the art based on the embodiments of the present disclosure without creative efforts shall fall within the protection scope of the present disclosure.

The technical solutions of the embodiments of the present disclosure may be applied to various communications systems, such as: a Global System for Mobile Communications (GSM) system, a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunications System (UMTS), a Worldwide Interoperability for Microwave Access (WiMAX) communication system, and a $5^{th}$ generation wireless system (5G system).

Figure 1:
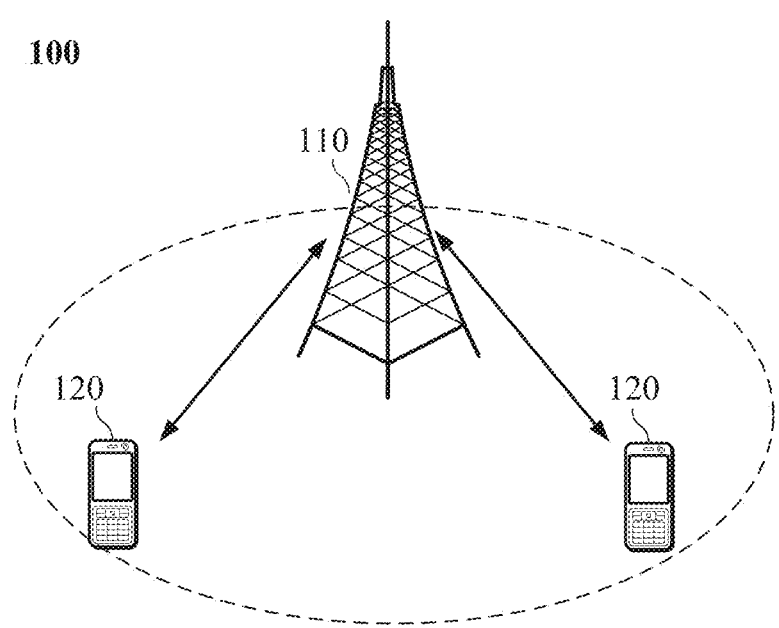
FIG. 1 is a schematic diagram of architecture of a communication system according to an embodiment of the present disclosure.

As an example, FIG. 1 illustrates a communication system 100 to which the embodiments of the present disclosure are applied. The communication system 100 may include a network device 110. The network device 110 may be a device communicating with a terminal device (also called as a communication terminal or a terminal). The network device 110 may provide communication coverage for a particular geographic area, and may communicate with a terminal device located within the coverage area. Optionally, the network device 110 may be a base transceiver station (BTS) in a GSM system or CDMA system, or may be a NodeB (NB) in a WCDMA system, or may be an evolved NodeB (eNB or eNodeB) in an LTE system, or a wireless controller in a cloud radio access network (CRAN); or, the network device may be a mobile switching center, a relay station, an access point, an in-vehicle device, a wearable device, a hub, a switch, a bridge, a router, a network side device in a 5G network, a network device in a future evolved public land mobile network (PLMN) or the like.

The wireless communications system 100 further includes at least one terminal device 120 located within the coverage of the network device 110. The terminal devices used herein are connected through, but is not limited to: a wired line such as a public switched telephone network (PSTN), a digital subscriber line (DSL), a digital cable, or a directness cable; and/or another data connection/network; and/or a wireless interface, such as for a cellular network, a wireless local area network (WLAN), a digital television network such as a DVB-H network, a satellite network, an AM-FM broadcasting transmitter; and/or apparatus configured to receive or send communication signals in another terminal device; and/or a device of Internet of things (IoT). The terminal device configured to communicate via a wireless interface may be called as a "wireless communication terminal", a "wireless terminal" or a "mobile terminal". Examples of a mobile terminal include but are not limited to: a satellite telephone or a cellular telephone; a personal communications system (PCS) terminal that is capable of combining capabilities of cellular radio telephones, data process, faxes and data communication; a PDA that may include a cellular radiotelephone, a pager, an Internet/Intranet access, a Web browser, an organizer, a calendar and/or a global positioning system (GPS) receiver; and a conventional laptop and/or palmtop receiver or other electronic device that includes a radiotelephone transceiver. The terminal device may be an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a 5G network, a terminal device in a future evolved PLMN or the like.

Optionally, the terminal devices 120 may perform device to device (D2D) communication with each other.

Optionally, the 5G system or network may be further referred to as a new radio (NR) system or network.

FIG. 1 illustrates one network device and two terminal devices as an example. Optionally, the communication system 100 may include multiple network devices and another number of terminal devices may be included within coverage of each network device. This is not limited in this embodiment of the present disclosure.

Optionally, the communication system 100 may further include other network entities such as a network controller and a mobility management entity. This is not limited in this embodiment of the present disclosure.

It should be understood that, a device having a communication function in a network/system of the embodiments of the present disclosure may be referred to as a communication device. Taking the communication system 100 illustrated in FIG. 1 as an example, a communication device may include a network device 110 and a terminal device 120 that have communication functions. The network device 110 and the terminal device 120 may be specific devices described above, details are not described herein again. The communication device may further include other devices in the communication system 100, such as a network controller, a mobility management entity or the like. This is not limited in this embodiment of the present disclosure.

It should be understood that, terms "system" and "network" in the present disclosure are usually interchangeably used. The term "and/or" in the present disclosure is only an association relationship for describing the associated objects, and represents that three relationships may exist, for example, A and/or B may represent the following three cases: A exists separately, both A and B exist, and B exists separately. In addition, the character "/" in this specification generally indicates an "or" relationship between the associated objects.

Figure 2:
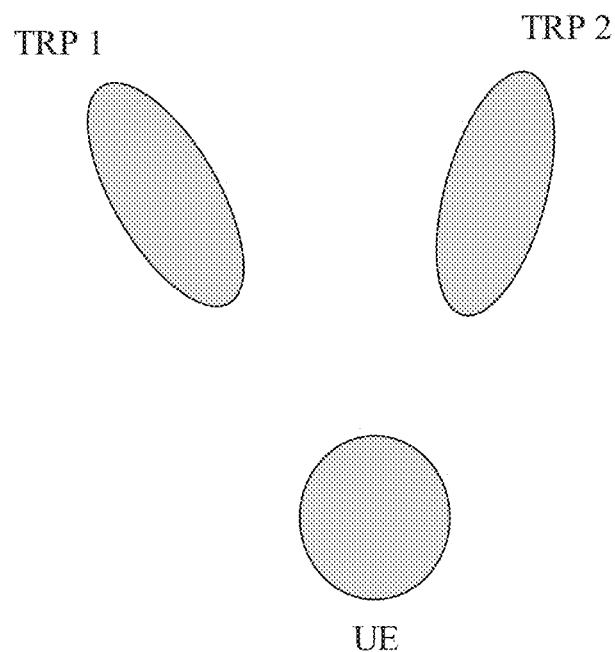
FIG. 2 is a schematic diagram of transmission of multiple downlink control channels according to an embodiment of the present disclosure.
Figure 3:
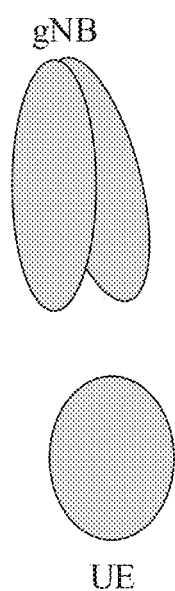
FIG. 3 is another schematic diagram of transmission of multiple downlink control channels according to an embodiment of the present disclosure.

In the new radio (NR) system, a terminal device may communicate with multiple transmission-reception points (TRPs) or multiple beams simultaneously. For example, as illustrated in FIG. 2, TRP1 and TRP2 may communicate with the terminal device simultaneously; as illustrated in FIG. 3, a base station (gNB) may communicate with the terminal device through multiple beams. The communication manner may adopt the following two schemes.

In a first scheme, UE receives only one PDCCH which indicates indication information of data transmitted through multiple TRPs/beams.

In a second scheme, UE receives different PDCCHs from different TRPs/beams, each of the PDCCHs indicates respective indication information of a data transmission.

The second scheme may be applied in the following scenarios.

Scenario 1: multiple TRPs belong to the same cell, a connection (backhaul) between the TRPs is ideal (i.e., the multiple TRPs can exchange information quickly and dynamically).

Scenario 2: multiple TRPs belong to the same cell, a backhaul between the TRPs is non-ideal (i.e., the multiple TRPs is not able to perform information interaction rapidly, and only relatively slow data interaction can be performed).

Scenario 3: multiple TRPs belong to different cells, a backhaul between the TRPs is ideal.

Scenario 4: multiple TRPs belong to different cells, a backhaul between the TRPs is non-ideal.

The four application scenarios of the second scheme are introduced above by taking the TRP as an example. The above four application scenarios may also be applied in multiple-beam scenarios. For brevity, details are not described herein again.

In the second scheme, UE needs to detect multiple pieces of downlink control Information (DCIs). However, if UE does not continue to detect downlink (DL) grant (i.e., DCI for downlink) when one DL grant is detected by the UE in a preset search space, the scheme would not be achieved. Therefore, solutions for solving this problem are provided in the following embodiments of the present disclosure. Herein, before describing the solutions in the embodiments of the present disclosure, introduction of some concepts in the embodiments of the present disclosure is provided, these concepts may be applied in all of the solutions in the embodiments of the present disclosure.

A search space/control resource set (CORESET) group in the embodiments of the present disclosure may be referred to a search space group or a CORESET group; each search space/CORESET group may include at least one search space/CORESET.

A search space in the embodiments of the present disclosure may be referred to a search space set, then one search space group may include at least one search space or search space set.

Each search space in the embodiments of the present disclosure may be associated with one control resource set, i.e., CORESET. One CORESET may be associated with one or more search spaces, different search spaces may be associated with different control resource sets.

The CORESET may indicate a size of the resource set in time domain, a size and position of the resource set in frequency domain. The position of the resource set in time domain is indicated by the search space.

The network device can configure the CORESET and the search space. During configuring the search space, a DCI format applicable to the search space, and whether the search space is used for carrying an uplink grant or a downlink grant or carrying the both may be configured.

FIG. 4 is a schematic block diagram of a method for wireless communication 200 according to an embodiment of the present disclosure. The method 200 includes at least part of the following content.

At 210, a terminal device detects M downlink control channels using N search space/control resource set (CORESET) groups, where N is an integer greater than or equal to 2, M is an integer greater than or equal to 2, and different search space/CORESET groups are used for detecting different downlink control channels.

Optionally, in an embodiment of the present disclosure, M is equal to N, and the N search space/CORESET groups are in one-to-one correspondences with M downlink control channels.

Specifically, the number of the downlink control channels detected by the terminal device may be equal to the number of search space/CORESET groups. Each downlink control channel may correspond to a respective search space/CORESET group, and the downlink control channel may be detected through the corresponding search space/CORESET group.

Of course, in an embodiment of the present disclosure, M may be not equal to N. For example, N may be larger than M, then a certain downlink control channel may correspond to more than two search space/CORESET groups, and then the more than two search space/CORESET groups may be detected when detecting the downlink control channel.

In an optional embodiment of the present disclosure, at least one of a downlink grant or an uplink grant may be carried in the downlink control channel. In an embodiment of the present disclosure, one downlink control channel may carry one downlink grant, or carry one uplink grant, or simultaneously carry one downlink grant and one uplink grant.

It should be understood that, the channel that carries one downlink grant and one uplink grant may also be referred to as two downlink control channels, which will not be limited in the embodiment of the present disclosure.

In an optional embodiment of the present disclosure, M downlink control channels may carry M downlink grants; or, M downlink control channels may carry M uplink grants; or, M downlink control channels may carry M uplink grants and M downlink grants.

It should be understood that, the embodiment of the present disclosure is not limited to this. As an example, some downlink control channels among the M downlink control channels may carry uplink grants and do not carry downlink grants, and some downlink control channels among the M downlink control channels may carry downlink grants and do not carry uplink grants. As an example, some downlink control channels among the M downlink control channels may carry uplink grants and downlink grants, and some downlink control channels among the M downlink control channels may carry uplink grants and do not carry downlink grants. As an example, some downlink control channels among the M downlink control channels may carry uplink grants and downlink grants, and some downlink control channels among the M downlink control channels may carry downlink grants and do not carry uplink grants.

In an optional embodiment of the present disclosure, the M downlink control channels may be transmitted simultaneously, i.e., transmitted at the same point in time.

In an optional embodiment of the present disclosure, the M downlink control channels may be transmitted through multiple beams, multiple TRPs, or multiple antenna panels. Specifically, the M downlink control channels may be transmitted through multiple beams, multiple TRPs, or multiple antenna panels simultaneously, and each downlink control channel is transmitted through a respective beam/TRP/antenna panel.

Optionally, M downlink control channels may be transmitted on the same carrier.

The embodiments of the present disclosure may be applied in a scenario of carrier aggregation, and each of at least part carriers in the carrier aggregation may transmit M downlink control channels.

Optionally, one downlink control channel is transmitted through one beam, one TRP or one antenna panel, and different downlink control channels are transmitted through different beams, TRPs or antenna panels, respectively.

When transmitting the downlink control channel through the beam, TRP or antenna panel, the corresponding search space/CORESET group may be applied for the transmission.

In an optional embodiment of the present disclosure, when one downlink (DL) grant is detected by the terminal device in a respective search space/CORESET group corresponding to each of the M downlink control channels, detection of the DL grant is stopped; and/or when one uplink (UL) grant is detected by the terminal device in a respective search space/CORESET group corresponding to each of the M downlink control channels, detection of the UL grant is stopped.

When one DL grant is detected by the terminal device in a search space/CORESET group corresponding to a certain downlink control channel, and no UL grant is detected in the search space/CORESET group, the terminal device may continue to detect the UL grant. Alternatively, the terminal device may detect only the DL grant in the search space/CORESET group and not detect the UL grant.

Similarly, when one UL grant is detected by the terminal device in a search space/CORESET group corresponding to a certain downlink control channel, and no DL grant is detected in the search space/CORESET group, the terminal device may continue to detect the DL grant. Alternatively, the terminal device may detect only the UL grant in the search space/CORESET group and not detect the DL grant.

Alternatively, whether the terminal device detects both the DL grant and the UL grant in a search space/CORESET group corresponding to a certain downlink control channel may be determined according to configuration of the search space/CORESET group.

For example, when a certain search space/CORESET group is configured for transmitting an UL grant, detection may be stopped when one UL grant is detected. When a certain search space/CORESET group is configured for transmitting a DL grant, detection may be stopped when one DL grant is detected. When a certain search space/CORESET group is configured for transmitting an UL grant and a DL grant, detection may be stopped when one UL grant and one DL grant are both detected.

A single carrier is considered here (even if the TRPs belong to different cells, there may be an overlapping part in the frequencies of the TRPs). In this case, one uplink grant and/or downlink grant may be carried in one downlink control channel. If considering carrier aggregation and cross-carrier scheduling, multiple downlink grants (and/or multiple uplink grants) may be detected through one search space/CORESET group, and different downlink grants (and/or uplink grants) correspond to physical downlink shared channel (PDSCH) schedulings (and/or physical uplink shared channel (PUSCH) schedulings) on different carriers.

In an optional embodiment of the present disclosure, an association between a search space/CORESET group and a downlink control channel may be preset in the terminal device according to a protocol. The association may also be pre-configured in the terminal device by other devices.

In an optional embodiment of the present disclosure, a respective search space/CORESET group that each search space/CORESET belongs to may be preset in the terminal device according to a protocol. It may also be pre-configured in the terminal device by other devices.

In a first implementation, a terminal device receives first information from a network device. The first information indicates a search space/CORESET group to which a first search space/CORESET belongs. The first search space/CORESET is any search space/CORESET included in the N search space/CORESET groups.

Specifically, the network device may indicate a search space/CORESET group to which a single search space/CORESET belongs.

The network device may be a TRP. The network device indicates only a search space/CORESET group to which a search space/CORESET used by the TRP per se for transmitting a downlink control channel belongs. The network device may indicate a search space/CORESET group to which a search space/CORESET used by another TRP for transmitting a downlink control channel belongs.

Alternatively, the network device may be a gNB. The gNB may indicate a respective search space/CORESET group to which each search space/CORESET included in the N search space/CORESET groups belongs. The gNB may transmit M downlink control channels through multiple beams or antenna panels; or, the gNB may control other devices (for example, M TRPs) to transmit M downlink control channels.

Optionally, since one CORESET may be associated with one or more search spaces, the terminal device may group the search spaces after a group to which a CORESET belongs is configured.

Optionally, the first information indicates the search space/CORESET group to which the first search space/CORESET belongs through at least one of: whether the first information carries a specific field; or a value of the specific field of the first information.

For example, if there are two search space/CORESET groups, and a specific field is carried in the first information, it means that the first search space/CORESET belongs to a first search space/CORESET group among the two search space/CORESET groups; if no specific field is carried in the first information, it means that the first search space/CORESET belongs to a second search space/CORESET group among the two search space/CORESET groups.

For example, if there are two search space/CORESET groups, and a value of a specific field carried in the first information is 0, it means that the first search space/CORESET belongs to a first search space/CORESET group among the two search space/CORESET groups; if the value of the specific field carried in the first information is 1, it means that the first search space/CORESET belongs to a second search space/CORESET group among the two search space/CORESET groups.

Optionally, the first information is used for configuring configuration information of the first search space/CORESET.

When configuring a certain search space/CORESET, configuration information of the certain search space/CORESET may indicate a search space/CORESET group to which the certain search space/CORESET belongs. The configuration information may also have other information, for example, information for indicating the DCI format of the search space/CORESET.

Optionally, the first information is carried in radio resource control (RRC) signaling or medium access control (MAC) control element (CE) signaling.

The MAC CE signaling is dedicated to the first information, or the MAC CE signaling is further used for carrying a transmission configuration information (TCI) state.

For clearer understanding about the first implementation, a first embodiment and a second embodiment are illustrated below respectively.

First Embodiment

A network device configures a search space for UE, configuration information of the search space includes an identity which indicates a search space group to which the search space belongs (i.e., SearchSpaceId).

There are two manners for configuring the identity.

Manner 1: the identity (field) is always in the configuration information, that is, each search space has a respective identity for indicating the group it belongs to.

Manner 2: the identity (field) is optional in the configuration information, and the search space belongs to a default group when the identity is not configured for the search space.

If the UE receives the configuration information for a certain search space transmitted by the network device, the UE determines whether the search space belongs to group X or Y according to the identity in the configuration information (herein, two groups are described for simplicity, the description may be extended to more than two groups).

If UE detects one DL grant in a search space belonging to the group X (herein, a single carrier is considered for simplicity, if considering carrier aggregation and cross-carrier scheduling, multiple DL grants may be detected according to the configuration, and different DL grants correspond to PDSCH schedulings on different carriers, respectively), the UE may perform some optimization processing, for example, UE may stop to detect DL grant to save power consumption. UE performs a similar operation in search spaces belonging to the group Y.

A physical implementation of the above embodiment may be as follows: the search spaces belonging to the group X correspond to PDCCH schedulings transmitted from TRP A, and the search spaces belonging to the group Y correspond to PDCCH schedulings transmitted from TRP B.

The specific signaling design may be adding a field on the basis of the existing RRC signaling.

Second Embodiment

A network device configures CORESET for UE, configuration information of the CORESET includes an identity which indicates a group to which the CORESET belongs (i.e., CORESET ID).

There are two manners for configuring the identity.

Manner 1: the field to which the identity belongs is always in the configuration information, that is, each CORESET has a respective identity for indicating the group it belongs to.

Manner 2: the field to which the identity belongs is optional in the configuration information, and the CORESET belongs to a default group when the identity is not configured for the CORESET.

If UE receives configuration information for CORESETs and search spaces, the UE determines groups for all of the search spaces according to the identity. Search spaces (SSs) associated with CORESETs belonging to the same group belong to the same group, and the SSs associated with the CORESETs of different groups belong to different groups, respectively. According to this rule, different groups may be divided into according to configuration information of all of the SSs and corresponding CORESETs. It is assumed that all of the SSs belong to group X and group Y (here, two groups are described for simplicity, the description may be generalized to more than two groups).

If UE detects one DL grant in a search space belonging to the group X (here, a single carrier is considered for simplicity, if considering carrier aggregation and cross-carrier scheduling, multiple DL grants may be detected according to the configuration, and different DL grants correspond to PDSCH schedulings on different carriers, respectively), UE may perform some optimization processing, for example, UE may stop to detect DL grant to save power consumption. UE performs a similar operation in search spaces belonging to the group Y.

A physical implementation of the above embodiment may be as follows: the search spaces belonging to the group X correspond to PDCCH schedulings transmitted through TRP A. and the search spaces belonging to the group Y correspond to PDCCH schedulings transmitted through TRP B.

The specific signaling design may be adding a field on the basis of the existing RRC signaling (or a new RRC signaling modified according to other function in the future).

Optionally, the network device may configure corresponding CORESET for UE through RRC signaling, and then configuring group information of one or more CORESETs through MAC CE. The above configuration may be in an individual MAC CE signaling, or, the above configuration may be in a signaling with MAC CE configuration of TC state.

In a second implementation, the terminal device receives second information from the network device. The second information indicates a respective search space/CORESET group to which each search space/CORESET included in the N search space/CORESET groups belongs.

The second information indicates a respective search space/CORESET group to which each search space/CORESET belongs by carrying an association between a search space/CORESET and a search space/CORESET group; or the second information indicates a search space/CORESET group to which a first search space/CORESET belongs according to whether the second information carries identity information of the first search space/CORESET.

Optionally, the second information is carried in one of the following fields in signaling: a physical downlink control channel (PDCCH) configuration filed, i.e., PDCCH-Config; a physical downlink shared channel (PDSCH) configuration filed, i.e., PDSCH-Config: a common PDCCH configuration filed, i.e., pdcch-ConfigCommon; or a common PDSCH configuration filed, i.e., pdsch-ConfigCommon. The common PDCCH configuration filed and the common PDSCH configuration filed may correspond to multiple terminal devices.

Optionally, the second information is carried in RRC signaling.

For clearer understanding of the present disclosure, a third embodiment is illustrated below.

Third Embodiment

Configuration information from the network device to UE indicates grouping information of multiple search spaces/control resource sets. The configuration information may include grouping information for SSs and/or grouping information for CORESETs.

Specifically, the configuration may be implemented as follows.

In an implementation, it is assumed that there are 2 groups.

Group 1 [identification number x1, identification number x2, . . . ](identification number of SS or CORESET)

Group 2 [identification number y1, identification number y2, . . . ](identification number of SS or CORESET)

In another implementation, it is assumed that there are 2 groups.

Group 0 [identification number x1, identification number x2, . . . ](identification number of SS or CORESET)

Other SSs or CORESETs which are not in the Group 0 belong to another group, i.e., Group 1.

The above configuration information may be configured in the following RRC signaling. Specifically, the configuration information may be carried in the following fields.

PDCCH-Config;
PDCCH-Config;
pdcch-ConfigCommon;
pdsch-ConfigCommon.

All of the SSs may belong to different groups according to the above configuration, and the UE may use a similar manner as in other embodiments for detecting a downlink control channel.

On the basis of the above solutions, UE is able to try to detect multiple downlink grants and uplink grants, and thus the condition that stopping detection when one downlink grant or uplink grant is detected is avoided. Therefore, the processing complexity of UE is reduced and the power consumption is saved. This is because if the network informs the UE to detect multiple downlink grants or uplink grants without the foregoing groups, the UE needs to try to detect two DCIs in each of the search spaces. But now if one DCI is detected in one group, there is no need to continue to detect the next DCI in the group, thereby the power consumption can be saved.

Accordingly, in the embodiments of the present disclosure, a terminal device detects M (M is an integer greater than or equal to 2) downlink control channels using N (N is an integer greater than or equal to 2) search space/CORESET groups, multiple downlink control channels can be detected. Moreover, different search space/CORESET groups are used for detecting different downlink control channels, there is no need for the terminal device to detect M downlink control channels in each search space, so that the power consumption of the terminal device is saved.

It should be understood that, in the embodiments of the present disclosure, the concept of search space/CORESET group may not be known in the terminal device side. The network device may configure a respective downlink control channel used by each search space/CORESET for detection, or configure a respective search space/CORESET corresponding to each downlink control channel during the specific configuration. In other words, the above configuration of the group to which a search space/CORESET belongs, corresponds to configuration of the downlink control channel used by the search space/CORESET for detection. However, a search space/CORESET corresponding to one downlink control channel may be understood as one search space/CORESET group.

FIG. 5 is a schematic block diagram of a method for wireless communication 300 according to an embodiment of the present disclosure. Optionally, the method may be implemented by a gNB.

At 310, a network device detects M downlink control channels using N search space/control resource set (CORESET) groups. The network device may transmit the downlink control channels through beams or multiple antenna panels.

N is an integer greater than or equal to 2, M is an integer greater than or equal to 2, and different search space/CORESET groups are used for detecting different downlink control channels.

In an optional embodiment of the present disclosure, M is equal to N, and the N search space/CORESET groups are in one-to-one correspondences with M downlink control channels.

In an optional embodiment of the present disclosure, the method 300 may further include that:

The network device transmits first information to a terminal device, the first information indicates a search space/CORESET group to which a first search space/CORESET belongs.

In an optional embodiment of the present disclosure, the first information indicates the search space/CORESET group to which the first search space/CORESET belongs through at least one of: whether the first information carries a specific field; or a value of the specific field of the first information.

In an optional embodiment of the present disclosure, the first information is used for configuring configuration information of the first search space/CORESET.

In an optional embodiment of the present disclosure, the first information is carried in radio resource control (RRC) signaling or medium access control (MAC) control element (CE) signaling.

In an optional embodiment of the present disclosure, the MAC CE signaling is dedicated to the first information, or the MAC CE signaling is further used for carrying a transmission configuration information (TCI) state.

In an optional embodiment of the present disclosure, the method 300 may further include that:

The network device transmits second information to the terminal device, where the second information indicates a respective search space/CORESET group to which each search space/CORESET included in the N search space/CORESET groups belongs.

In an optional embodiment of the present disclosure, the second information indicates a respective search space/CORESET group to which each search space/CORESET belongs by carrying an association between a search space/CORESET and a search space/CORESET group; or the second information indicates a search space/CORESET group to which a first search space/CORESET belongs through whether the second information carries identity information of the first search space/CORESET.

In an optional embodiment of the present disclosure, the second information is carried in one of the following fields in signaling: a physical downlink control channel (PDCCH) configuration filed; a physical downlink shared channel (PDSCH) configuration filed; a common PDCCH configuration filed; or a common PDSCH configuration filed.

In an optional embodiment of the present disclosure, the second information is carried in RRC signaling.

In an optional embodiment of the present disclosure, at least one of the following applies; the M downlink control channels are used for uplink scheduling; or the M downlink control channels are used for downlink scheduling.

In an optional embodiment of the present disclosure, the M downlink control channels are transmitted through M beams respectively; or the M downlink control channels are from M transmission-reception points (TRPs) respectively.

In an optional embodiment of the present disclosure, the M downlink control channels are simultaneously transmitted through the M beams or by the M TRPs, respectively.

In an optional embodiment of the present disclosure, the M downlink control channels are transmitted through the same carrier.

It should be understood that, the specific implementation of the method 300 may refer to the description of the method 200. For brevity, details are not described herein again.

FIG. 6 is a schematic block diagram of a method for wireless communication 400 according to an embodiment of the present disclosure. The method may be implemented by a gNB or TRP.

The method 400 includes at least part of the following contents.

At 410, a network device transmits first information to a terminal device, the first information indicates a search space/CORESET group, among N search space/CORESET groups, to which a first search space/CORESET belongs. The N search space/CORESET groups are used by the terminal device for detecting M downlink control channels.

N is an integer greater than or equal to 2, M is an integer greater than or equal to 2, and different search space/CORESET groups are used for detecting different downlink control channels.

In an optional embodiment of the present disclosure, the first information indicates the search space/CORESET group to which the first search space/CORESET belongs through at least one of: whether the first information carries a specific field; or a value of the specific field of the first information.

In an optional embodiment of the present disclosure, the first information is used for configuring configuration information of the first search space/CORESET.

In an optional embodiment of the present disclosure, the first information is carried in radio resource control (RRC) signaling or medium access control (MAC) control element (CE) signaling.

In an optional embodiment of the present disclosure, the MAC CE signaling is dedicated to the first information; or the MAC CE signaling is further used for carrying a transmission configuration information (TCI) state.

It should be understood that, the specific implementation of the method 400 may refer to the description of the method 200. For brevity, details are not described herein again.

FIG. 7 is a schematic block diagram of a method for wireless communication 500 according to an embodiment of the present disclosure. The method 500 includes at least part of the following contents. The method may be implemented by a gNB or TRP.

At 510, a network device transmits second information to a terminal device, the second information indicates a respective search space/control resource set (CORESET) group to which each search space/CORESET included in N search space/CORESET groups belongs.

The N search space/CORESET groups are used by the terminal device for detecting M downlink control channels.

N is an integer greater than or equal to 2, M is an integer greater than or equal to 2, and different search space/CORESET groups are used for detecting different downlink control channels.

In an optional embodiment of the present disclosure, the second information indicates a respective search space/CORESET group to which each search space/CORESET belongs by carrying an association between a search space/CORESET and a search space/CORESET group; or the second information indicates a search space/CORESET group to which a first search space/CORESET belongs through whether the second information carries identity information of the first search space/CORESET.

In an optional embodiment of the present disclosure, the second information is carried in one of the following fields in signaling; a physical downlink control channel (PDCCH) configuration filed; a physical downlink shared channel (PDSCH) configuration filed; a common PDCCH configuration filed; or a common PDSCH configuration filed.

In an optional embodiment of the present disclosure, the second information is carried in radio resource control (RRC) signaling.

It should be understood that, the specific implementation of the method 500 may refer to the description of the method 200. For brevity, details are not described herein again.

Figure 8:
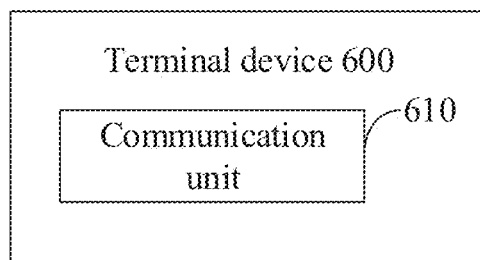
FIG. 8 is a schematic block diagram of a terminal device according to an embodiment of the present disclosure.

FIG. 8 is a schematic block diagram of a terminal device 600 according to an embodiment of the present disclosure. The terminal device 600 includes a communication unit 610.

The communication unit 610 is configured to detect M downlink control channels using N search space/control resource set (CORESET) groups.

N is an integer greater than or equal to 2, M is an integer greater than or equal to 2, and different search space/CORESET groups are used for detecting different downlink control channels.

In an optional embodiment of the present disclosure, M is equal to N. and the N search space/CORESET groups are in one-to-one correspondences with M downlink control channels.

In an optional embodiment of the present disclosure, the communication unit 610 is further configured to receive first information from a network device.

The first information indicates a search space/CORESET group to which a first search space/CORESET belongs.

In an optional embodiment of the present disclosure, the first information indicates the search space/CORESET group to which the first search space/CORESET belongs through at least one of: whether the first information carries a specific field; or a value of the specific field of the first information.

In an optional embodiment of the present disclosure, the first information is used for configuring configuration information of the first search space/CORESET.

In an optional embodiment of the present disclosure, the first information is carried in radio resource control (RRC) signaling or medium access control (MAC) control element (CE) signaling.

In an optional embodiment of the present disclosure, the MAC CE signaling is dedicated to the first information; or the MAC CE signaling is further used for carrying a transmission configuration information (TCI) state.

In an optional embodiment of the present disclosure, the communication unit 610 is further configured to receive second information from the network device.

The second information indicates a respective search space/CORESET group to which each search space/CORESET included in the N search space/CORESET groups belongs.

In an optional embodiment of the present disclosure, the second information indicates a respective search space/CORESET group to which each search space/CORESET belongs by carrying an association between a search space/CORESET and a search space/CORESET group; or the second information indicates a search space/CORESET group to which a first search space/CORESET belongs through whether the second information carries identity information of the first search space/CORESET.

In an optional embodiment of the present disclosure, the second information is carried in one of the following fields in signaling: a physical downlink control channel (PDCCH) configuration filed; a physical downlink shared channel (PDSCH) configuration filed; a common PDCCH configuration filed; or a common PDSCH configuration filed.

In an optional embodiment of the present disclosure, the second information is carried in RRC signaling.

In an optional embodiment of the present disclosure, at least one of the following applies: the M downlink control channels are used for uplink scheduling; or the M downlink control channels are used for downlink scheduling.

In an optional embodiment of the present disclosure, the M downlink control channels are transmitted through M beams respectively; or the M downlink control channels are from M transmission-reception points (TRPs) respectively.

In an optional embodiment of the present disclosure, the M downlink control channels are simultaneously transmitted through the M beams or by the M TRPs, respectively.

In an optional embodiment of the present disclosure, the communication unit 610 is further configured to:

when at least one of one downlink (DL) grant or one uplink (UL) grant is detected in a respective search space/CORESET group corresponding to each of the M downlink control channels, stopping detection.

In an optional embodiment of the present disclosure, M downlink control channels are transmitted through the same carrier.

It should be understood that, the terminal device 600 may be configured to implement corresponding operations that are implemented by the terminal device of method 200. For brevity, details are not described herein again.

Figure 9:
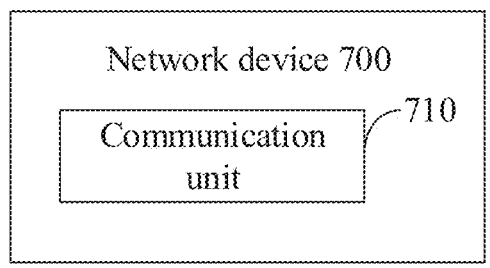
FIG. 9 is a schematic block diagram of a network device according to an embodiment of the present disclosure.

FIG. 9 is a schematic block diagram of a network device 700 according to an embodiment of the present disclosure. The network device 700 includes a communication unit 710.

In an optional embodiment of the present disclosure, a terminal device detects M downlink control channels using N search space/CORESET groups, where N is an integer greater than or equal to 2, M is an integer greater than or equal to 2, and different search space/CORESET groups are used for detecting different downlink control channels.

In an optional embodiment of the present disclosure, M is equal to N, and the N search space/CORESET groups are in one-to-one correspondences with M downlink control channels.

In an optional embodiment of the present disclosure, the communication unit 710 is configured to transmit first information to a terminal device.

The first information indicates a search space/CORESET group to which a first search space/CORESET belongs.

In an optional embodiment of the present disclosure, the first information indicates the search space/CORESET group to which the first search space/CORESET belongs through at least one of: whether the first information carries a specific field, or a value of the specific field of the first information.

In an optional embodiment of the present disclosure, the first information is used for configuring configuration information of the first search space/CORESET.

In an optional embodiment of the present disclosure, the first information is carried in radio resource control (RRC) signaling or medium access control (MAC) control element (CE) signaling.

In an optional embodiment of the present disclosure, the MAC CE signaling is dedicated to the first information; or the MAC CE signaling is further used for carrying a transmission configuration information (TCI) state.

In an optional embodiment of the present disclosure, the communication unit 710 is configured to transmit second information to the terminal device.

The second information indicates a respective search space/CORESET group to which each search space/CORESET included in N search space/CORESET groups belongs.

In an optional embodiment of the present disclosure, the second information indicates a respective search space/CORESET group to which each search space/CORESET belongs by carrying an association between a search space/CORESET and a search space/CORESET group; or the second information indicates a search space/CORESET group to which a first search space/CORESET belongs through whether the second information carries identity information of the first search space/CORESET.

In an optional embodiment of the present disclosure, the second information is carried in one of the following fields in signaling: a physical downlink control channel (PDCCH) configuration filed; a physical downlink shared channel (PDSCH) configuration filed; a common PDCCH configuration filed; or a common PDSCH configuration filed.

In an optional embodiment of the present disclosure, the second information is carried in RRC signaling.

In an optional embodiment of the present disclosure, at least one of the following applies: the M downlink control channels are used for uplink scheduling; or the M downlink control channels are used for downlink scheduling.

In an optional embodiment of the present disclosure, the M downlink control channels are transmitted through M beams respectively; or the M downlink control channels are from M transmission-reception points (TRPs) respectively.

In an optional embodiment of the present disclosure, the M downlink control channels are simultaneously transmitted through the M beams or by the M TRPs, respectively.

In an optional embodiment of the present disclosure, M downlink control channels are transmitted through a single carrier.

It should be understood that, the network device 700 may be configured to implement corresponding operations that are implemented by the network device of methods 200-500. For brevity, details are not described herein again.

Figure 10:
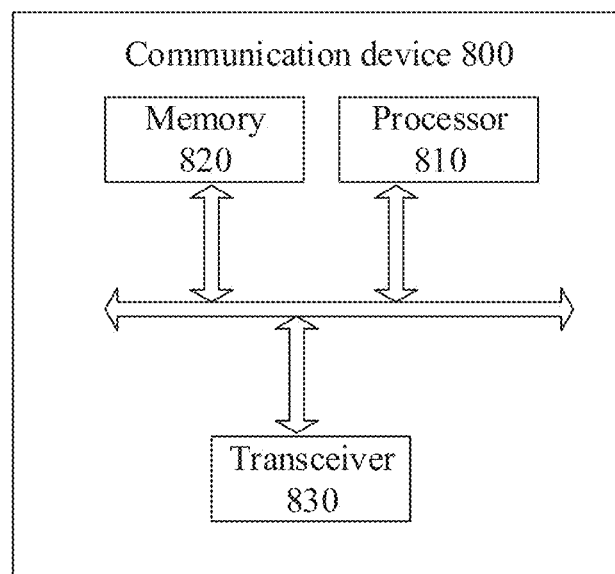
FIG. 10 is a schematic block diagram of a communication device according to an embodiment of the present disclosure.

FIG. 10 is a schematic structure diagram of a communication device 800 according to an embodiment of the present disclosure. The communication device 800 illustrated in FIG. 10 includes a processor 810. The processor 810 may be configured to call and execute a computer program stored in a memory to perform the method according to an embodiment of the present disclosure.

Optionally, as illustrated in FIG. 10, the communication device 800 may further include a memory 820. The processor 810 may be configured to call and execute the computer program stored in the memory 820 to perform the method according to an embodiment of the present disclosure.

The memory 820 may be an individual device independent from the processor 810, or may be integrated in the processor 810.

Optionally, as illustrated in FIG. 10, the communication device 800 may further include a transceiver 830. The processor 810 may control the transceiver 830 to communicate with other devices, specifically, to transmit information or data to other devices, or receive information or data from other devices.

The transceiver 830 may include a transmitter and a receiver. The transceiver 830 may further include an antenna, the number of antennas may be one or more.

Optionally, the communication device 800 may specifically be a network device in the embodiments of the present disclosure. The communication device 800 may implement corresponding processes that are implemented by the network device in various methods of the embodiments of the present disclosure. For brevity, details are not described herein again.

Optionally, the communication device 800 may specifically be a mobile terminal/terminal device in the embodiments of the present disclosure. The communication device 800 may implement corresponding processes that are implemented by the mobile terminal/terminal device in various methods of the embodiments of the present disclosure. For brevity, details are not described herein again.

Figure 11:
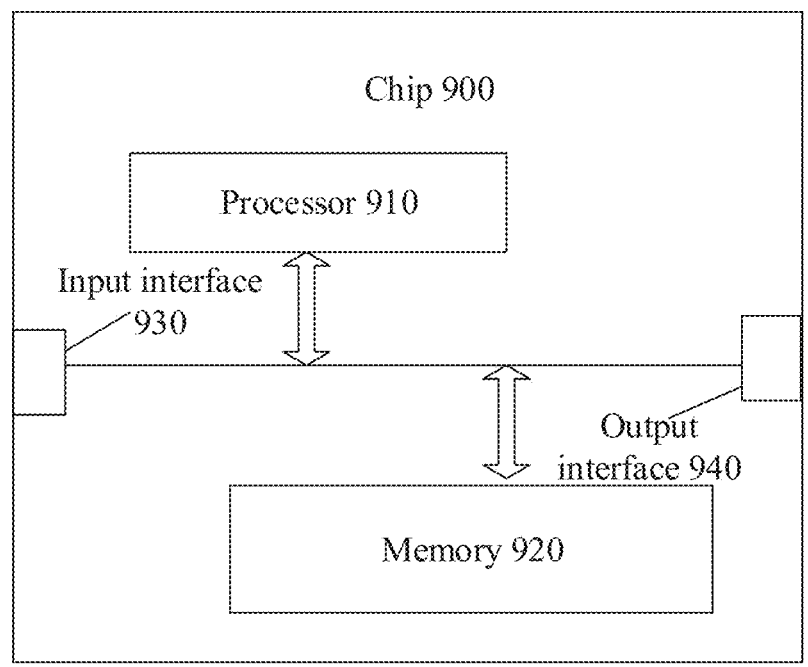
FIG. 11 is a schematic block diagram of a chip according to an embodiment of the present disclosure.

FIG. 11 is a schematic structure diagram of a chip according to an embodiment of the present disclosure. The chip 900 illustrated in FIG. 11 includes a processor 910. The processor 910 may be configured to call and execute a computer program stored in a memory to perform the method according to an embodiment of the present disclosure.

Optionally, as illustrated in FIG. 11, the chip 900 may further include a memory 920. The processor 910 may be configured to call and execute the computer program stored in the memory 920 to perform the method according to an embodiment of the present disclosure.

The memory 920 may be an individual device independent from the processor 910, or may be integrated in the processor 910.

Optionally, the chip 900 may further include an input interface 930. The processor 910 may control the input interface 930 to communicate with other devices or chips, specifically, to obtain information or data from other devices or chips.

Optionally, the chip 900 may further include an output interface 940. The processor 910 may control the output interface 940 to communicate with other devices or chips, specifically, to output information or data to other devices or chips.

Optionally, the chip may be applied to a network device in the embodiments of the present disclosure. The chip may implement corresponding processes that are implemented by the network device in various methods of the embodiments of the present disclosure. For brevity, details are not described herein again.

Optionally, the chip may be applied in a mobile terminal/terminal device in the embodiments of the present disclosure. The chip may implement corresponding processes that are implemented by the mobile terminal/terminal device in various methods of the embodiments of the present disclosure. For brevity, details are not described herein again.

It should be understood that, the chip mentioned in the embodiments of the present disclosure may be also referred to a system-level chip, a system chip, a chip system or a chip of a system on chip, etc.

Figure 12:
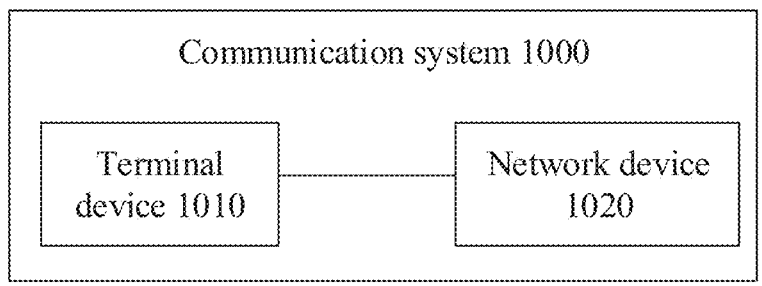
FIG. 12 is a schematic block diagram of a communication system according to an embodiment of the present disclosure.

FIG. 12 is a schematic block diagram of a communication system 1000 according to an embodiment of the present disclosure. As illustrated in FIG. 12, the communication system 1000 includes a terminal device 1010 and a network device 1020.

The terminal device 1010 may be configured to implement corresponding functions that are implemented by the terminal device of the above method. And the network device 1020 may be configured to implement corresponding functions that are implemented by the network device of the above method. For brevity, details are not described herein again.

It should be understood that, the processor of the embodiment of the present disclosure may be an integrated circuit chip, and has a signal processing capability. During implementation, the steps of the foregoing method embodiments may be implemented using a hardware integrated logic circuit in the processor or implemented using one or more instructions in a software form. The foregoing processor may be a general purpose processor, a digital signal processor (DSP), an application-specific integrated circuit (ASIC), a field programmable gate array (FPGA), or another programmable logical device, discrete gate or transistor logical device, or discrete hardware component. The processor may implement or perform methods, steps and logical block diagrams disclosed in the embodiments of the present disclosure. The general purpose processor may be a microprocessor or the processor may be any conventional processor and the like. Steps of the methods disclosed with reference to the embodiments of the present disclosure may be directly executed and completed by means of a hardware decoding processor, or may be executed and completed using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information from the memory and completes the steps in the foregoing methods in combination with hardware of the processor.

It can be understood that, the memory in the embodiments of the present disclosure may be a transitory memory or a non-transitory memory, or may include both a transitory memory and a non-transitory memory. The non-transitory memory may be a read-only memory (ROM), a programmable read-only memory (PROM), an erasable programmable read-only memory (EPROM), an electrically erasable programmable read-only memory (EEPROM) or a flash memory. The transitory memory may be a random access memory (RAM), and is used as an external cache. Through exemplary but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM) and a direct rambus random access memory (DR RAM). It should be noted that, the memory for the system and the method described herein aims to include but not limited to these memories and any other suitable types of memories.

It should be understood that, the foregoing memory is exemplary but not limitative description, for example, the memory in the embodiments of the present disclosure may be a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synch link dynamic random access memory (SLDRAM) and a direct rambus random access memory (DR RAM), etc. It should be noted that, the memory in the embodiments of the present disclosure aims to include but not limited to these memories and any other suitable types of memories.

An embodiment of the present disclosure further provides a computer-readable storage medium, configured to store a computer program.

Optionally, the computer-readable storage medium may be applied to a network device in embodiments of the present disclosure, and the computer program causes a computer to perform corresponding processes that are implemented by the network device in various methods of the embodiments of the present disclosure. For brevity, details are not described herein again.

Optionally, the computer-readable storage medium may be applied to a mobile terminal/terminal device in embodiments of the present disclosure, and the computer program causes a computer to perform corresponding processes that are implemented by the mobile terminal/terminal device in various methods of the embodiments of the present disclosure. For brevity, details are not described herein again.

An embodiment of the present disclosure further provides a computer program product including a computer program.

Optionally, the computer program product may be applied to a network device in embodiments of the present disclosure, and the computer program instructions cause a computer to perform corresponding processes that are implemented by the network device in various methods of the embodiments of the present disclosure. For brevity, details are not described herein again.

Optionally, the computer program product may be applied to a mobile terminal/terminal device in embodiments of the present disclosure, and the computer programs cause a computer to perform corresponding processes that are implemented by the mobile terminal/terminal device in various method of the embodiments of the present disclosure. For brevity, details are not described herein again.

An embodiment of the present disclosure further provides a computer program.

Optionally, the computer program may be applied to a network device in embodiments of the present disclosure, when the computer program is executed by a computer, it causes the computer to perform corresponding processes that are implemented by the network device in various method of the embodiments of the present disclosure. For brevity, details are not described herein again.

Optionally, the computer program may be applied to a mobile terminal/terminal device in embodiments of the present disclosure, when the computer program is executed by a computer, it causes the computer to perform corresponding processes that are implemented by the mobile terminal/terminal device in various method of the embodiments of the present disclosure. For brevity, details are not described herein again.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other schemes. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional module and sold or used as an independent product, the functions may be stored in a computer-readable storage medium. Based on such an understanding, the technical solutions of this application essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to perform all or a part of the steps of the method described in the embodiment of the present disclosure. The foregoing storage medium includes: any medium that can store program codes, such as a USB flash disk, a removable hard disk, a read-only memory (ROM), a random access memory (RAM), a magnetic disk, or an optical disk.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for wireless communication, comprising:
   detecting, by a terminal device, M downlink control channels using N groups of control resource sets (CORESETs),
   wherein N is an integer greater than or equal to 2, M is an integer greater than or equal to 2, and different groups of CORESETs are used for detecting different downlink control channels,
   wherein the method further comprises:
   receiving, by the terminal device, first information from a network device,
   wherein the first information indicates a CORESET group to which a first CORESET belongs, through at least one of: whether the first information carries a specific field, or a value of the specific field of the first information; and
   wherein the first information is carried in radio resource control (RRC) signaling.

2. The method of claim 1, wherein M is equal to N, and the N groups of CORESETs are in one-to-one correspondences with the M downlink control channels.

3. The method of claim 1, wherein the first information is used for configuring configuration information of the first CORESET.

4. The method of claim 1, wherein at least one of the following applies:
   the M downlink control channels are used for uplink scheduling; or
   the M downlink control channels are used for downlink scheduling.

5. The method of claim 1, wherein the M downlink control channels are transmitted through a single carrier.

6. A terminal device, comprising:
   a transceiver, configured to detect M downlink control channels using N groups of control resource sets (CORESETs),
   wherein N is an integer greater than or equal to 2, M is an integer greater than or equal to 2, and different groups of CORESETs are used for detecting different downlink control channels,
   wherein the transceiver is further configured to:
   receive first information from a network device,
   wherein the first information indicates a CORESET group to which a first CORESET belongs, through at least one of: whether the first information carries a specific field, or a value of the specific field of the first information; and
   wherein the first information is carried in radio resource control (RRC) signaling.

7. The terminal device of claim 6, wherein M is equal to N, and the N groups of CORESETs are in one-to-one correspondences with the M downlink control channels.

8. The terminal device of claim 6, wherein the first information is used for configuring configuration information of the first CORESET.

9. The terminal device of claim 6, wherein at least one of the following applies:
   the M downlink control channels are used for uplink scheduling; or
   the M downlink control channels are used for downlink scheduling.

10. The terminal device of claim 6, wherein the M downlink control channels are transmitted through a single carrier.

11. A method for wireless communication, comprising:
  detecting, by a network device, M downlink control channels using N groups of control resource sets (CORESETs),
  wherein N is an integer greater than or equal to 2, M is an integer greater than or equal to 2, and different groups of CORESETs are used for detecting different downlink control channels,
  wherein the method further comprises:
  transmitting, by the network device, first information to a terminal device,
  wherein the first information indicates a CORESET group to which a first CORESET belongs, through at least one of: whether the first information carries a specific field, or a value of the specific field of the first information; and
  wherein the first information is carried in radio resource control (RRC) signaling.

12. The method of claim 11, wherein M is equal to N, and the N groups of CORESETs are in one-to-one correspondences with the M downlink control channels.

13. The method of claim 11, wherein the first information is used for configuring configuration information of the first CORESET.

14. The method of claim 11, wherein at least one of the following applies:
  the M downlink control channels are used for uplink scheduling; or
  the M downlink control channels are used for downlink scheduling.

15. The method of claim 11, wherein the M downlink control channels are transmitted through a single carrier.

16. A network device, comprising:
  a transceiver, configured to detect M downlink control channels using N groups of control resource sets (CORESETs),
  wherein N is an integer greater than or equal to 2, M is an integer greater than or equal to 2, and different groups of CORESETs are used for detecting different downlink control channels,
  wherein the transceiver is further configured to:
  transmit first information to a terminal device,
  wherein the first information indicates a CORESET group to which a first CORESET belongs, through at least one of: whether the first information carries a specific field, or a value of the specific field of the first information; and
  wherein the first information is carried in radio resource control (RRC) signaling.

17. The network device of claim 16, wherein M is equal to N, and the N groups of CORESETs are in one-to-one correspondences with the M downlink control channels.

18. The network device of claim 16, wherein the first information is used for configuring configuration information of the first CORESET.

19. The network device of claim 16, wherein at least one of the following applies:
  the M downlink control channels are used for uplink scheduling; or
  the M downlink control channels are used for downlink scheduling.

20. The network device of claim 16, wherein the M downlink control channels are transmitted through a single carrier.

* * * * *